United States Patent

[11] 3,620,458

[72] Inventor Albert Rath
 Kitchener, Ontario, Canada
[21] Appl. No. 30,410
[22] Filed Apr. 21, 1970
[45] Patented Nov. 16, 1971
[73] Assignee Eastern Steel Products Ltd.
 Preston, Ontario, Canada

[54] DUAL-PURPOSE VEHICLE
 7 Claims, 9 Drawing Figs.
[52] U.S. Cl. ................................................ 239/657,
 239/663, 298/17.6
[51] Int. Cl. ............................................... A01c 17/00
[50] Field of Search .......................................... 239/657,
 663; 298/17.5, 17.6, 17.8, 22 D

[56] References Cited
UNITED STATES PATENTS
2,697,609 12/1954 Chase et al. .................. 239/657
2,620,225 12/1952 Hutchinson .................. 298/22 D
3,158,375 11/1964 Vig ............................... 239/657
3,189,355 6/1965 Swenson et al. ............. 239/663 X FOREIGN PATENTS
807,748 7/1951 Germany ...................... 298/17.6

*Primary Examiner*—M. Henson Wood, Jr.
*Assistant Examiner*—John J. Love
*Attorney*—Maybee & Legris ABSTRACT: A dual-purpose vehicle for use as a spreader and as a dump truck, the vehicle having a dump body mounted on a base frame, means are provided for hinging the dump body to the base frame at alternative positions adjacent to the forward and rear ends of the base frame, and the dump body is raised about the respective hinge axis by means of a hydraulic ram operating through a toggle linkage. When the vehicle is to be used as a spreader or sander, the forward hinge is secured and the ram is operated to tilt the dump body forwards. When only the rear hinge is secured, the vehicle can be used as a conventional dump truck.

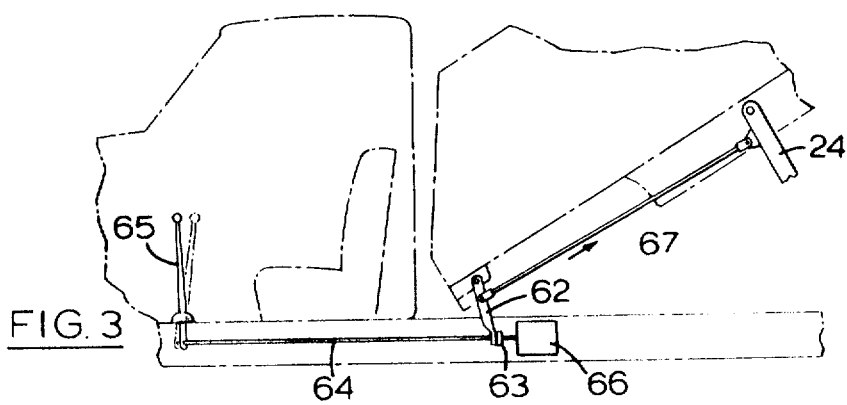
FIG. 3
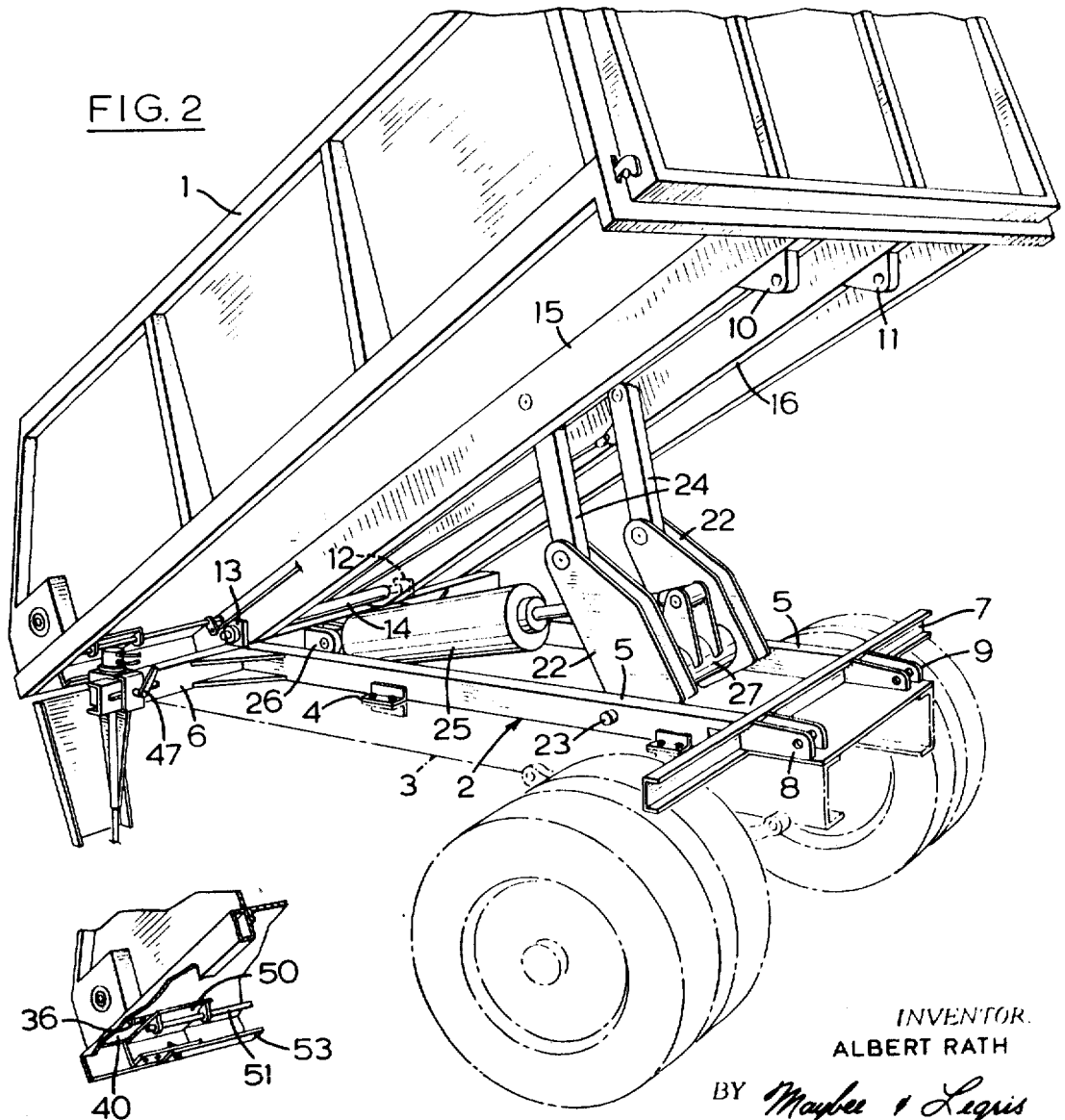
FIG. 2
FIG. 2a
INVENTOR.
ALBERT RATH
BY Maybee & Legris
ATTORNEYS INVENTOR.
ALBERT RATH
BY Maybee & Legris
ATTORNEYS 3,620,458

DUAL-PURPOSE VEHICLE

This invention relates to a dual-purpose vehicle which is adapted for use alternatively as a spreader or sander and as a dump truck. Conventional spreaders or sanders have large hopperlike bodies designed for one purpose only, namely carrying salt and/or sand to be spread across a road surface during the winter months. They are expensive vehicles, but for the greater part of the year there is no use to which they can be put in order to make them more economic.

Dual-purpose vehicles to be used as sanders and dump trucks are known, but the previously known vehicles of this type are very expensive indeed, and because of their construction they suffer from the disadvantage that they tend to be unstable when the dump body is in the tilted position.

According to the present invention, in a dual-purpose vehicle for use as a spreader and as a dump truck, the vehicle having a dump body mounted on a base frame, means are provided for hinging the dump body to the base frame at alternative positions adjacent to the forward and rear ends of the base frame, and the dump body is raised about the respective hinge axis by means of a hydraulic ram operating through a toggle linkage. When the vehicle is to be used as a spreader or sander, the forward hinge is secured and the ram is operated to tilt the dump body forwards. When only the rear hinge is secured, the vehicle can be used as a conventional dump truck.

In order that the invention may be readily understood, a dual-purpose vehicle in accordance with the invention will now be described by way of example with reference to the accompanying drawings, in which:

FIG. 2 is a fragmentary perspective view of the vehicle with the dump body tipped in the opposite direction, the vehicle being used as a spreader;

FIG. 2a is a scrap view showing a detail of FIG. 2;

FIG. 3 is a schematic illustration of a safety device for limiting forward tipping of the dump body;

Figure 1:
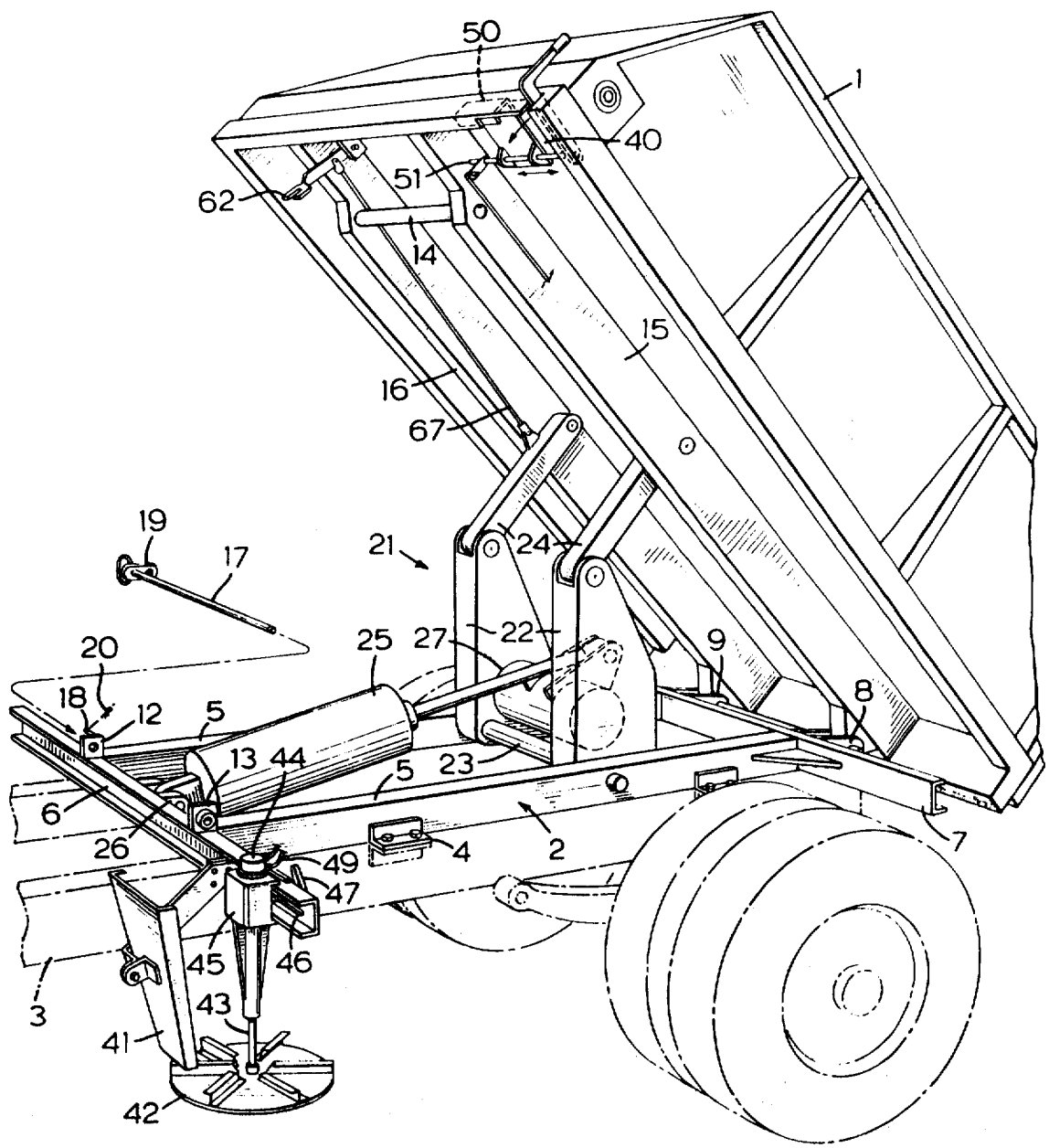
FIG. 1 is a fragmentary perspective view of the vehicle with the dump body tipped in one direction, the vehicle being used as a dump truck.

Referring to Figures 1 and 2, the dump body 1 of the vehicle is mounted on a base frame 2, which is secured to the vehicle chassis 3 by means of bolted pairs of flanges 4 welded to the frame and the chassis. The frame comprises a pair of longitudinal frame members 5 and front and rear transverse frame members 6, 7 whose ends are disposed outside of the longitudinal members. The rear ends of the longitudinal members are extended and are constructed to provide a pair of hinge sockets 8, 9, which are positioned to cooperate with a pair of hinge sockets 10, 11 on the underside of the dump body 1 adjacent its rear end. A pair of upstanding lugs 12, 13 on the front transverse frame member 6 provide another pair of hinge sockets which cooperate with the ends of a tubular member 14 extending between two longitudinal beams 15, 16 on the underside of the dump body 1, the ends of the tube 14 forming in effect another pair of hinge sockets cooperating with the sockets 12 and 13. When the vehicle is to be used as a dump truck in which the dump body may be tipped backwards, a readily removable hinge pin is inserted into the aligned pairs of cooperating hinge sockets 8, 9 and 10, 11. The hinge pin 17 is illustrated in FIG. 1, and the chain-dot line A shows that the same hinge pin may be inserted into the cooperating pairs of hinged sockets formed by the lugs 12, 13 and the tube 14. It will be seen that the lug 12 is formed with a horizontally extending short pin 18 which engages a hole in a plate 19 at one end of the hinge pin 17 when the hinge pin is inserted in the sockets, and the hinge pin is secured by means of a retaining pin 20 which passes through a transverse hole in the pin 18.

The mechanism for raising and lowering the dump body, forwards or backwards according to the position of the hinge pin 17, comprises a toggle linkage 21 connected between the base frame 2 and the dump body 1 at a position intermediate the two alternative positions of the hinge pin 17. The toggle linkage comprises a pair of side members 22 mounted on a pivotal shaft 23 extending between the longitudinal members 5, a pair of links 24 pivotally connected at their ends to the members 22 and the beams 15, 16 on the underside of the dump body, and a ram 25. The ram is pivotally connected at one end to a pair of lugs 26 on the front transverse frame member 6, and at the other end to a crossmember 27.

Figure 4:
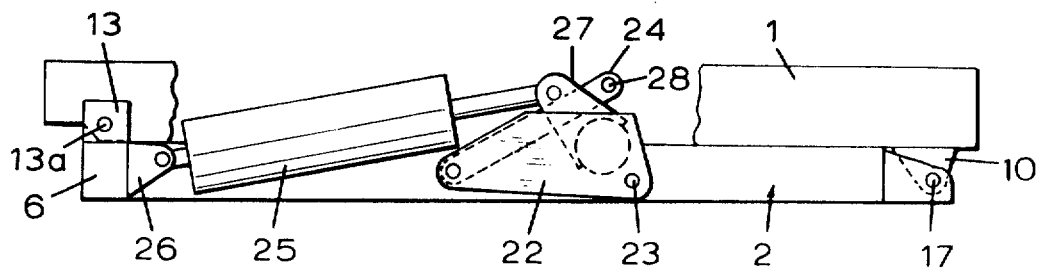
FIGS. 4, 5 and 6 are schematic diagrams of the tipping mechanism, the Figures showing the mechanism when the dump body is in its down position, when the dump body is tipped backwards, and when the dump body is tipped forwards, respectively.
Figure 5:
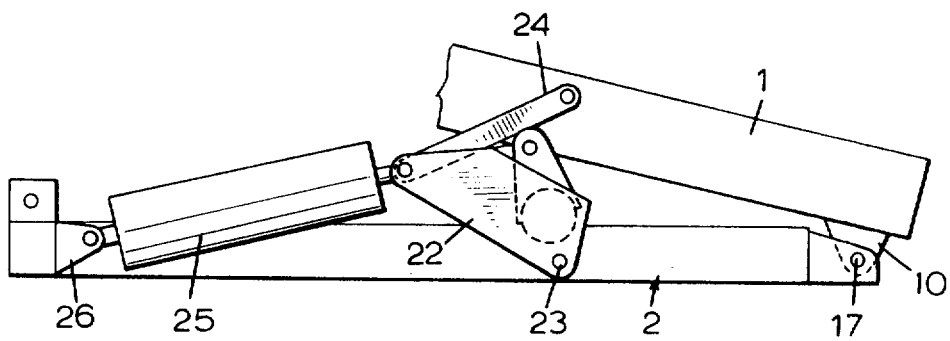
Figure 6:
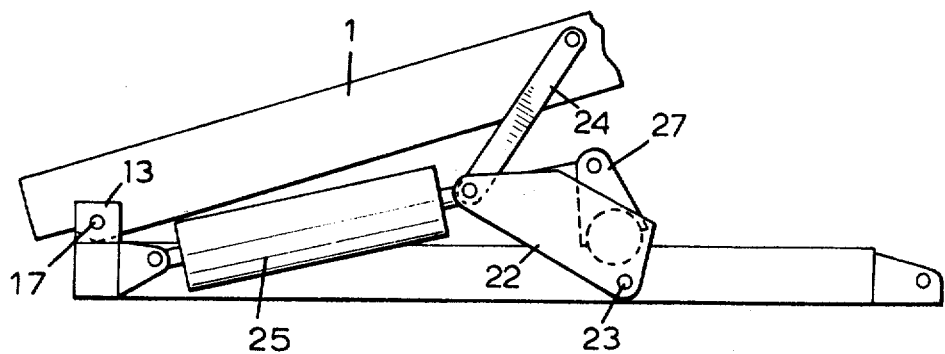

The manner of operation of the toggle linkage will best be understood by reference to Figures 4, 5 and 6.

FIG. 4 shows the ram 25 in its retracted position pivoted at one end to the lugs 26 on the front transverse frame member 6, and pivoted at the other end to the crossmember 27. The toggle members 22 are mounted on shaft 23 pivoted on the base frame 2, and the toggle members 24 are secured by pivots 28 to the dump body 1, which is hinged by hinge pin 17 to the base frame 2. The alternative position of the hinge pin 17 is shown by hinged socket 13a in the lug 13.

FIG. 5 shows the manner of operation of the toggle linkage when the hinge pin 17 secures the cooperating pairs of hinge sockets at the rear end of the vehicle. Extension of the ram 25 moves the toggle linkage to raise the dump body 1 about the hinge pin, thus tipping the dump body backwards.

FIG. 6 shows the action of the toggle linkage when the hinge pin 17 secures the cooperating pairs of hinge sockets at the front end of the base frame, the ram 25 in this case acting on the toggle linkage to tip the dump body 1 about the hinge pin in a forward direction as shown.

Figure 7:
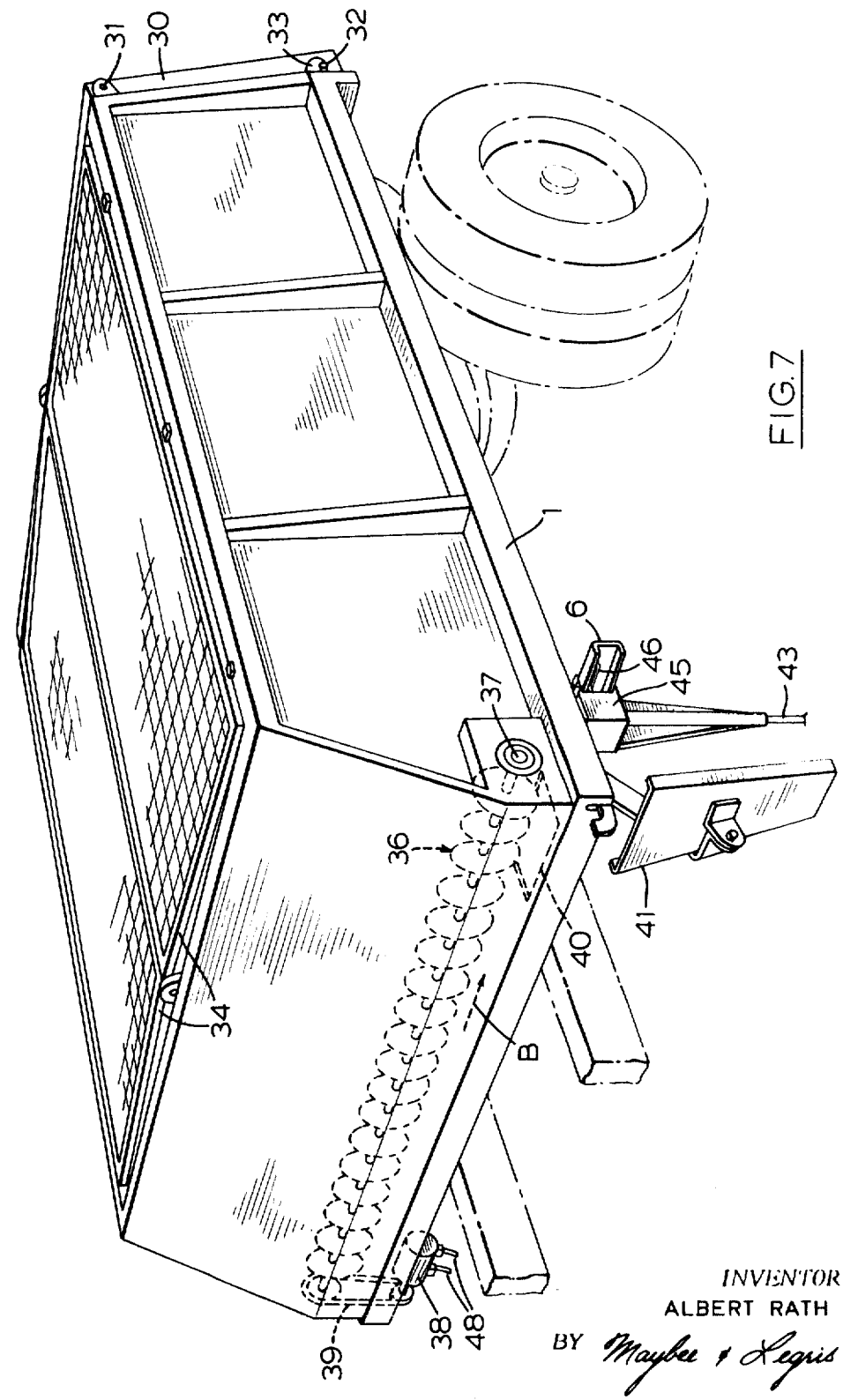
FIG. 7 is a general perspective view of the dump body.

Referring now also to FIG. 7, the dump body itself is fitted with a conventional tail gate 30, which is pivoted to the body 1 at 31 and is releasably secured by means of a pin 32 engaging a releasable latch 33 operable in the well-known manner from the driver's cabin. The top of the dump body is covered by means of a pair of hinged grid members 34 through which sand and fine material may be loaded without introducing large bodies. The dump body has a front wall 35 which, when the vehicle is to be used as a sander or spreader, slopes backwards in the manner shown in FIG. 7. The front wall 35 may be moved to a vertical position when the vehicle is used as a conventional dump truck, the wall being formed with a pair of end plates (not shown) which are adapted to form forward extensions of the sidewalls of the dump body. Within the dump body 1 immediately adjacent to its front end is a feed auger 36 mounted on a rotatable shaft 37 which is driven by a hydraulic motor 38 through a chain and sprocket drive 39. The auger feeds salt, sand or the like in the direction shown by arrow B in FIG. 7 towards a gate 40 through which the material drops onto a chute 41. The chute 41 guides the material onto a spinner 42 which is rotated by a vertical shaft 43 driven by a hydraulic motor 44. The motor 44 is mounted on a support member 45 and is adjustable in a transverse direction with respect to the base frame, for which purpose a short horizontal slot 46 is formed near one end of the member 6, and a clamp member 47 is provided. Hydraulic connections for the motors 38 and 44 are shown at 48 and 49 respectively.

The gate 40 is adjustable by means of a laterally adjustable closure plate 50 mounted on a cross pin 51, the plate being set to its adjusted position by means of a bolt through cooperating holes in the plate 50 and a flange 53 at the rear end of the dump body.

A particular advantage of the present construction is that the auger 36, the spinner 42, and the ram 25 are all operated hydraulically, enabling a fine adjustment of the spinner and auger speeds.

Figure 8:
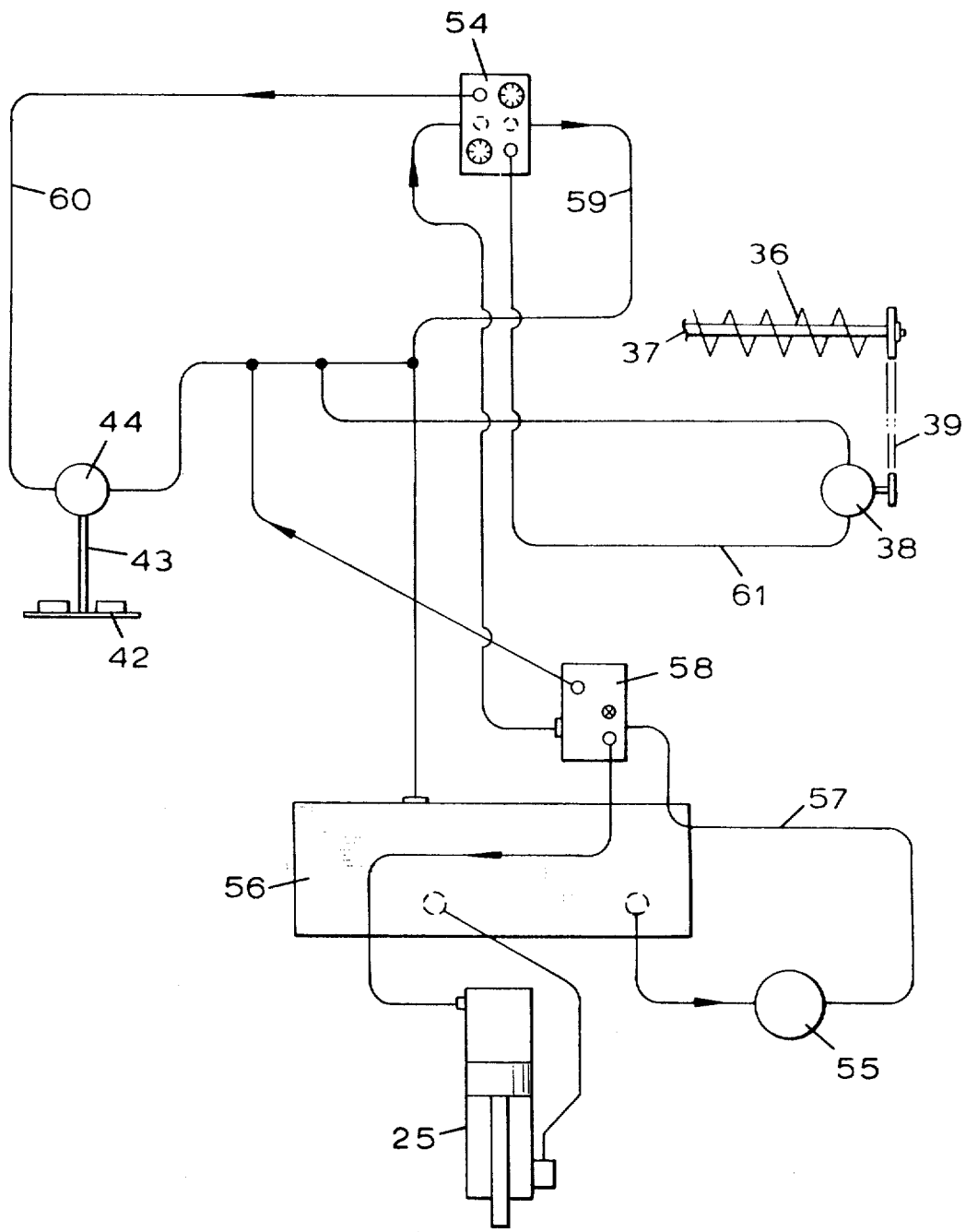
FIG. 8 is a diagram of the hydraulic circuits used to operate the ram, the feed auger and the spinner.

Referring to FIG. 8, a hydraulic pump 55 draws hydraulic fluid from a tank 56 and delivers it via a line 57 to a directional control valve 58 and thence to a flow regulator 54. A return pipe from the flow regulator 54 to the tank 56 is indicated at 59. The spinner motor 44 receives its hydraulic supply from the regulator 54 by a line 60, the regulator providing an infinite adjustment of the hydraulic supply and motor speed. Similarly, the auger motor 38 receives its hydraulic supply from the flow regulator 54, and is infinitely adjustable thereby. The ram 25 is connected between an outlet of the directional control valve 58 and the tank 56. It should be mentioned that the lines 60 to the spinner motor and 61 to the auger motor include detachable hoses and hose adapters by which these items may be readily removed when they are not required.

Referring now to FIG. 3, a forked member 62 (also shown in FIG. 1) extends down from the underside of the dump body near its front end, and this fork member is adapted to engage a stop 63 fitted on a link 64 extending between a driver's control lever 65 and a safety valve 66. The lever 62 is also connected by a link 67 to one of the upper toggle members 24. When the dump body is raised in a forward direction, the forked member 62 engages the link 64, and the movement of the toggle linkage is such that the link 67 is pulled backwards, thus pulling the forked member 62 against the stop 63 and moving the latter backwards. When a limit position is reached the valve 66 is closed, shutting off the supply of hydraulic fluid to the ram and at the same time pulling the control lever 65 to the position shown in full lines in FIG. 3.

The construction described above provides a vehicle which may be readily converted from a dump truck to a sander or spreader, or vice versa. A single removable hinge pin is used to secure the cooperating pairs of hinge sockets at either the front end or the rear end of the vehicle. No adjustment of the toggle linkage or ram is necessary, in order to affect the conversion, apart from ensuring that the hoses providing the hydraulic connections to the ram are positioned to allow for the full movement of the dump body.

What I Claim as my Invention is: claim

1. In a dual-purpose vehicle adapted for use alternatively as a spreader and a dump truck:
   a. a base frame secured to the vehicle chassis, the base frame comprising longitudinal and transverse frame members and having front and rear ends;
   b. a dump body mounted on the base frame;
   c. first means providing a releasable hinge connection between the base frame and the dump body at a position adjacent the rear end of the base frame;
   d. second means providing a releasable hinge connection between the base frame and the dump body at a position adjacent the front end of the base frame;
   e. means for securing said first and second means alternatively to permit pivotal movement of the dump body about respective transverse axis at said positions;
   f. a toggle linkage connected between the base frame and the dump body, at a position intermediate said positions, and
   g. a hydraulic ram pivotally connected at one end to the base frame and at the other end to the toggle linkage for actuating the toggle linkage whereby to permit pivotal movement of the dump body about one or other transverse axis according to which of the hinge connections is secured.

2. A dual-purpose vehicle according to claim 1, in which each of said first and second means comprises cooperating pairs of hinge sockets on the base frame and the dump body, and the means for securing said first and second means is a removable hinge pin adapted to be inserted into the cooperating pairs of hinge sockets at either of said positions.

3. In a dual-purpose vehicle adapted for use alternatively as a spreader and a dump truck:
   a. a base frame secured to the vehicle chassis, the base frame comprising longitudinal and transverse frame members and having front and rear ends;
   b. a dump body mounted on the base frame;
   c. first means providing a releasable hinge connection between the base frame and the dump body at a position adjacent the rear end of the base frame;
   d. second means providing a releasable hinge connection between the base frame and the dump body at a position adjacent the front end of the base frame;
   e. means for securing said first and second means alternatively to permit pivotal movement of the dump body about respective transverse axis at said positions;
   f. a toggle linkage connected between the base frame and the dump body, at a position intermediate said positions;
   g. a hydraulic ram pivotally connected at one end to the base frame, and at the other end to the toggle linkage for actuating the toggle linkage whereby to permit pivotal movement of the dump body about one or other transverse axis according to which of the hinge connections is secured.
   h. a feed auger extending transversely within the dump body at a position adjacent its forward end;
   i. a first hydraulic motor for driving the feed auger;
   j. a door or gate in the base of the dump body, the door or gate being positioned to receive granular material fed by the feed auger;
   k. a spinner mounted below the dump body;
   l. a second hydraulic motor for driving the spinner;
   m. a chute extending downwardly from the door or gate to deliver granular material therefrom onto the spinner, and
   n. means for connecting the hydraulic motors and ram to a hydraulic fluid supply.

4. A dual-purpose vehicle according to claim 3, including first and second adjustable valve means for regulating the supply of hydraulic fluid to the first and second hydraulic motors whereby to control the operating speeds of the motors.

5. A dual-purpose vehicle according to claim 4, wherein the valve means are continuously adjustable for controlling said operating speeds over a continuous range.

6. A dual-purpose vehicle according to claim 3, in which the spinner is mounted on a vertical rotatable shaft extending from the second hydraulic motor, the motor being mounted on a support member which is adjustable in a transverse direction with respect to the base frame.

7. A dual-purpose vehicle according to claim 3, including a safety valve for preventing the supply of hydraulic fluid to the ram, and a link connected between the valve and the toggle linkage, the link being movable with the dump body and operable to actuate the valve when the dump body reaches a predetermined limiting position.

* * * * *